May 1, 1951     R. T. QUISH ET AL     2,551,052

WINDSHIELD COVER

Filed April 20, 1949

INVENTORS.
WILLIAM P. QUISH
JOHN J. CRATTY
RAYMOND T. QUISH
JOHN F. TIERNEY
BY Louis V. Lucia
ATTORNEY.

Patented May 1, 1951

2,551,052

UNITED STATES PATENT OFFICE 2,551,052

WINDSHIELD COVER

Raymond T. Quish, William P. Quish, John J. Cratty, and John F. Tierney, Manchester, Conn., assignors to Cratish Corporation, Manchester, Conn., a corporation of Connecticut Application April 20, 1949, Serial No. 88,614

2 Claims. (Cl. 160—368)

This invention relates to a windshield cover and more particularly to a cover which is primarily intended for use on windshields of automobiles to protect them from being covered with snow, sleet, frost or fog.

An object of this invention is to provide a cover for such windshields which may be easily attached and detached therefrom.

A further object of the invention is the provision of such a windshield cover having suction cups for attaching it to the windshield and means for detaching the cover from the cups so that the said cups may remain on the windshield in fixed position to receive the cover.

Further objects and advantages of this invention will be more clearly understood from the following description and the accompanying drawing in which.

Figure 1:
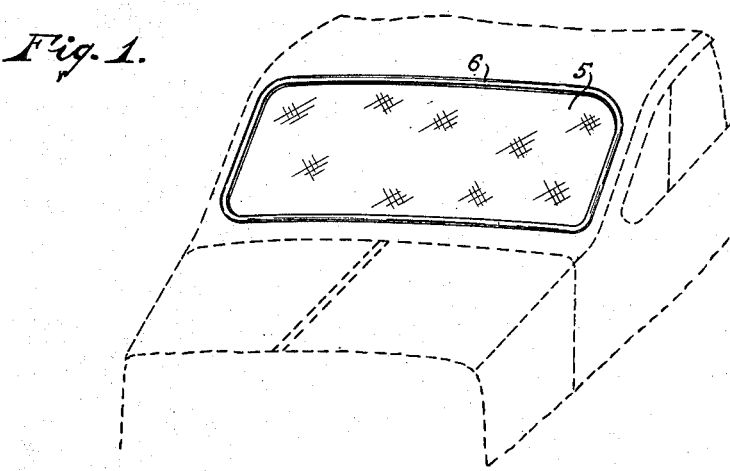
Fig. 1 is a perspective front view of a windshield cover embodying our invention; the same being shown attached to the windshield of an automobile which is indicated in dotted lines.
Figure 2:
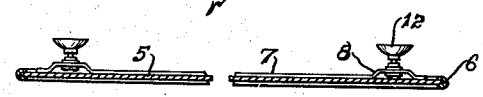
Fig. 2 is a sectional top view of the said windshield cover on line 2—2 of Fig. 3.
Figure 5:
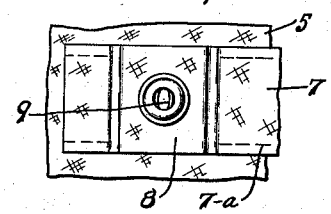
Fig. 5 is a fragmentary plan view thereof with the suction cup removed.
Figure 3:
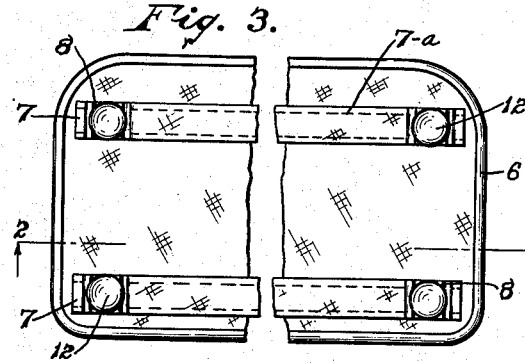
Fig. 3 is a rear view of such cover.

As shown in the drawing, our improved windshield cover is preferably constructed of a sheet of flexible material 5, such as plastic, or waterproof cloth, and may be provided with a peripheral binding strip 6 if desired.

A pair of horizontal flexible strips 7—7, preferably of similar material, are sewed to the back of the said cover as indicated by dotted lines 7—a, and are provided with loose portions 8 adjacent to the corners of the cover and to each of which there is secured a suitable snap fastener, preferably of a conventional type having a spring 9 adapted to grip the head 10 of a stud which is imbedded in and projects from a boss 11 on a vacuum cup 12.

Figure 4:
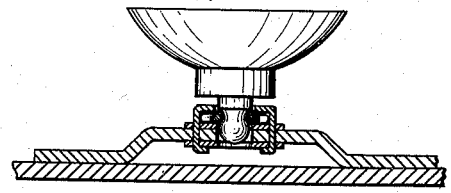
Fig. 4 is a fragmentary sectional view illustrating the manner in which the suction cups are fastened to the windshield cover.

In the use of our invention, the vacuum cups are first attached to the cover, as illustrated in Fig. 4, and the said cover is then mounted over the windshield by placing it thereagainst and pressing each of the cups so as to cause them to become fastened to the windshield by a vacuum therebetween. When the cover is attached in this manner, the cups are automatically positioned on the windshield to detachably receive the cover and permit it to be quickly and easily detached from or attached to the windshield when desired.

In order to detach the cover from the windshield, it is simply necessary to grasp the corners of the cover and pull them away from the windshield. This permits the fasteners to become disengaged from the studs of their respective vacuum cups and thereby leave the cups attached to the windshield and in their proper position.

Our invention renders it possible to detach the cover from the windshield by simply grasping one corner and pulling it outwardly, thus causing the other corners to become disengaged and thereby rendering it highly convenient and easy to remove a cover while standing at one side of the vehicle. This is of considerable importance, particularly when a vehicle is parked alongside a bank of snow and it is impossible for a person to reach the opposite side of the windshield to break the vacuum in the cups, such as would be required where the suction cups are permanently attached to the cover.

We claim:

1. A windshield cover comprising a sheet of flexible material, a pair of parallel spaced strips secured to said sheet and having loose portions, a spring fastener attached to each of said portions, a plurality of vacuum cups each having a stud projecting therefrom, and a head portion on said stud adapted to be received by said fasteners for detachably securing the cover to a windshield.

2. A windshield cover comprising a sheet of flexible material, a strip of flexible material secured to the back of said sheet adjacent both the upper and lower edges thereof and being provided with loose portions adjacent the opposite ends thereof, a fastener attached to each of said loose portions, a plurality of vacuum cups for attaching the cover to a windshield, and studs on said cups cooperating with said fasteners for detachably securing the cover to a windshield.

RAYMOND T. QUISH.
WILLIAM P. QUISH.
JOHN J. CRATTY.
JOHN F. TIERNEY.

REFERENCES CITED

The following references are of record in the file of this patent:

UNITED STATES PATENTS

| Number | Name | Date |
| --- | --- | --- |
| 2,119,072 | Cohen | May 31, 1938 |
| 2,331,600 | Dillow | Oct. 12, 1943 |
| 2,489,901 | Kocinski | Nov. 29, 1949 |